US012691716B1

(12) United States Patent
Hall et al.

(10) Patent No.: US 12,691,716 B1
(45) Date of Patent: Jul. 28, 2026

(54) SUSPENSION SYSTEM, VEHICLE, AND METHOD OF ADJUSTING THE SUSPENSION SYSTEM

(71) Applicant: GM GLOBAL TECHNOLOGY OPERATIONS LLC, Detroit, MI (US)

(72) Inventors: Devon R. Hall, Ann Arbor, MI (US); Matthew Watts, South Lyon, MI (US); Brian K. Saylor, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/319,972

(22) Filed: Sep. 5, 2025

(51) Int. Cl.
 *B60G 17/016* (2006.01)
 *B60G 3/20* (2006.01)

(52) U.S. Cl.
 CPC ........... *B60G 17/0164* (2013.01); *B60G 3/20* (2013.01); *B60G 2200/144* (2013.01); *B60G 2204/143* (2013.01); *B60G 2204/62* (2013.01); *B60G 2206/124* (2013.01); *B60G 2400/0522* (2013.01); *B60G 2400/106* (2013.01); *B60G 2401/00* (2013.01); *B60G 2600/182* (2013.01); *B60G 2800/014* (2013.01); *B60G 2800/9123* (2013.01)

(58) Field of Classification Search
 CPC ................. B60G 17/0164; B60G 3/20; B60G 2200/144; B60G 2204/143; B60G 2204/62; B60G 2206/124; B60G 2400/0522; B60G 2400/106; B60G 2401/00; B60G 2600/182; B60G 2800/9123
 USPC .................... 280/124.128, 124.134, 124.135
 See application file for complete search history.

(56) References Cited

U.S. PATENT DOCUMENTS

| | | | | | |
|---|---|---|---|---|---|
| 4,616,845 | A | * | 10/1986 | Pettibone | B60G 3/205 |
| | | | | | 72/704 |
| 4,736,964 | A | * | 4/1988 | Specktor | B60G 7/02 |
| | | | | | 280/86.753 |
| 4,796,720 | A | * | 1/1989 | Bauer | B60G 21/007 |
| | | | | | 280/5.509 |
| 5,052,711 | A | * | 10/1991 | Pirkey | B62D 17/00 |
| | | | | | 280/86.753 |
| 6,170,838 | B1 | * | 1/2001 | Laurent | B60G 3/01 |
| | | | | | 280/5.521 |
| 6,511,078 | B2 | * | 1/2003 | Sebe | B60G 7/001 |
| | | | | | 280/5.521 |
| 7,914,020 | B2 | * | 3/2011 | Boston | B62D 9/04 |
| | | | | | 280/124.136 |
| 9,233,589 | B1 | * | 1/2016 | Miller | F16B 43/00 |
| 11,014,608 | B2 | * | 5/2021 | Quatrano | B60G 17/0162 |

(Continued)

FOREIGN PATENT DOCUMENTS

| | | |
|---|---|---|
| CN | 119858409 A | 4/2025 |
| DE | 102010036722 A1 | 2/2011 |

(Continued)

*Primary Examiner* — Toan C To
(74) *Attorney, Agent, or Firm* — Quinn IP Law

(57) ABSTRACT

A suspension system, vehicle, and method of adjusting the suspension system include a chassis having a first mounting point and a second mounting point spaced apart from the first mounting point; a suspension including a suspension mount attached to the chassis at one of the first mounting point and the second mounting point; and an actuator attached to and configured to shift the suspension mount between the first mounting point and the second mounting point.

19 Claims, 7 Drawing Sheets

(56)                     References Cited

U.S. PATENT DOCUMENTS

| | | | | |
|---|---|---|---|---|
| 11,548,552 | B2 * | 1/2023 | Chen | B62D 17/00 |
| 12,202,537 | B2 * | 1/2025 | Reisner | B60G 7/02 |
| 2019/0375455 | A1 | 12/2019 | No et al. | |

FOREIGN PATENT DOCUMENTS

| | | | |
|---|---|---|---|
| DE | 102010061008 | A1 | 9/2011 |
| DE | 102013019790 | A1 | 6/2014 |
| DE | 102018131491 | A1 | 12/2019 |
| DE | 102021131069 | A1 | 6/2023 |
| KR | 101339244 | A | 12/2013 |

* cited by examiner

SUSPENSION SYSTEM, VEHICLE, AND METHOD OF ADJUSTING THE SUSPENSION SYSTEM

INTRODUCTION

The disclosure relates to a suspension system, a vehicle, and a method of adjusting the suspension system.

A suspension system for a vehicle absorbs vibration, gravitation, and impact forces from a surface of travel and may be designed to optimize contact between wheels of the vehicle and the surface of travel. Suspension mounting points or hardpoints are precise three-dimensional locations where components of the suspension system attach to a chassis of the vehicle. Such suspension mounting points may determine how the vehicle handles and behaves during acceleration and deceleration. For example, suspension mounting points may contribute to ride comfort and pitch performance of the vehicle during acceleration and deceleration.

SUMMARY

A suspension system for a vehicle includes a chassis having a first mounting point and a second mounting point spaced apart from the first mounting point; a suspension including a suspension mount attached to the chassis at one of the first mounting point and the second mounting point; and an actuator attached to and configured to shift the suspension mount between the first mounting point and the second mounting point.

In one aspect, the first mounting point may be a nominal location such that the suspension may have a first jounce recession value and the chassis may have a first pitch gradient value. The second mounting point may be an adjusted location such that the suspension may have a second jounce recession value that is less than the first jounce recession value and the chassis may have a second pitch gradient value that is less than the first pitch gradient value.

In an additional aspect, the suspension may further include a plurality of suspension mounts. The plurality of suspension mounts may include an upper aft suspension mount; an upper fore suspension mount spaced apart from the upper aft suspension mount along a first longitudinal axis; a lower aft suspension mount spaced apart from the upper aft suspension mount along a first axis; and a lower fore suspension mount spaced apart from the lower aft suspension mount along a second longitudinal axis and spaced apart from the upper fore suspension mount along a second axis. The first longitudinal axis and the second longitudinal axis may intersect at: a nominal instant center when one of the plurality of suspension mounts is disposed at the first mounting point such that the suspension has a first jounce recession value and the chassis has a first pitch gradient value; and an adjusted instant center spaced apart from the nominal instant center when the one of the plurality of suspension mounts is disposed at the second mounting point such that the suspension has a second jounce recession value that is less than the first jounce recession value and the chassis has a second pitch gradient value that is less than the first pitch gradient value.

In another aspect, the suspension mount may extend away from the chassis when the suspension mount is disposed at the second mounting point.

In a further aspect, the suspension may include a control arm having an inboard end adjacent the chassis. The suspension mount may be disposed at the inboard end and may define a slot therein.

In one aspect, the actuator may be a rotational actuator and may include a camming mechanism configured to move the control arm within the slot towards the chassis to the first mounting point and away from the chassis to the second mounting point.

In an additional aspect, the actuator may include an over center mechanism configured to move the control arm within the slot towards the chassis to the first mounting point and away from the chassis to the second mounting point.

In another aspect, the actuator may be a linear actuator configured to move the control arm within the slot towards the chassis to the first mounting point and away from the chassis to the second mounting point.

A vehicle includes a wheel configured for traveling along a surface and including a wheel hub. The vehicle includes a suspension system configured to optimize contact between the wheel and the surface. The suspension system includes a chassis spaced apart from the wheel and including a first mounting point and a second mounting point spaced apart from the first mounting point. The suspension system also includes a suspension including a control arm having: an inboard end disposed adjacent to the chassis; an outboard end disposed adjacent to the wheel hub; a suspension mount disposed on the inboard end and attached to the chassis at one of the first mounting point and the second mounting point; and a joint disposed on the outboard end and including a steering knuckle attached to the wheel hub. The suspension system further includes an actuator attached to and configured to shift the suspension mount between the first mounting point and the second mounting point.

In one aspect, the first mounting point may be a nominal location such that the suspension may have a first jounce recession value and the vehicle may have a first pitch gradient value. The second mounting point may be an adjusted location such that the suspension may have a second jounce recession value that is less than the first jounce recession value and the vehicle may have a second pitch gradient value that is less than the first pitch gradient value.

In an additional aspect, the vehicle may further include an inertial measurement unit configured for sensing a longitudinal acceleration and an angular rate of the vehicle as the vehicle travels along the surface; and a controller disposed in electrical communication with the inertial measurement unit and the actuator and configured for actuating the actuator on demand and in real time based on the longitudinal acceleration and the angular rate.

In another aspect, the suspension may have a ride comfort configuration when the suspension has the first jounce recession value in which the wheel may translate rearward towards the chassis along a longitudinal axis parallel to the surface as the vehicle traverses an obstacle in the surface; and a pitch performance configuration when the vehicle has the second pitch gradient value in which a rotation of the chassis about a lateral axis of the vehicle may be reduced from the first pitch gradient value. The controller may actuate the actuator on demand to move the suspension mount to the first mounting point and thereby prioritize the ride comfort configuration over the pitch performance configuration. The controller also may actuate the actuator on demand to move the suspension mount to the second mounting point and thereby prioritize the pitch performance configuration over the ride comfort configuration.

In a further aspect, the suspension mount may define a slot therein.

In one aspect, the actuator may be a rotational actuator and may include a camming mechanism configured to move the control arm within the slot towards the chassis to the first mounting point and away from the chassis to the second mounting point.

In an additional aspect, the actuator may include an over center mechanism configured to move the control arm within the slot towards the chassis to the first mounting point and away from the chassis to the second mounting point.

In another aspect, the actuator may be a linear actuator configured to move the control arm within the slot towards the chassis to the first mounting point and away from the chassis to the second mounting point.

In a further aspect, the suspension may further include an upper control arm and a lower control arm each having a plurality of suspension mounts. The upper control arm may include an upper aft suspension mount and an upper fore suspension mount spaced apart from the upper aft suspension mount along a first longitudinal axis. The lower control arm may include a lower aft suspension mount spaced apart from the upper aft suspension mount along a first axis and a lower fore suspension mount spaced apart from the lower aft suspension mount along a second longitudinal axis and spaced apart from the upper fore suspension mount along a second axis. The actuator may be attached to one of: the upper aft suspension mount such that the actuator may be configured to move the upper aft suspension mount along the first axis with respect to the lower aft suspension mount; the lower aft suspension mount such that the actuator may be configured to move the lower aft suspension mount along the first axis with respect to the upper aft suspension mount; the upper fore suspension mount such that the actuator may be configured to move the upper fore suspension mount along the second axis with respect to the lower fore suspension mount; and the lower fore suspension mount such that the actuator may be configured to move the lower fore suspension mount along the second axis with respect to the upper fore suspension mount.

A method of adjusting a suspension system of a vehicle includes monitoring: an inertial measurement unit of the vehicle configured for sensing a longitudinal acceleration and an angular rate of the vehicle as a wheel of the vehicle travels along a surface; a demand condition requesting adjustment of the suspension system; and a threshold positional condition of the vehicle. The suspension system includes a chassis having a first mounting point and a second mounting point spaced apart from the first mounting point; a suspension including a suspension mount attached to the chassis at one of the first mounting point and the second mounting point; and an actuator attached to and configured to shift the suspension mount between the first mounting point and the second mounting point. Concurrent to monitoring, the method includes setting, with a controller that is disposed in electrical communication with the inertial measurement unit and the actuator and configured for actuating the actuator on demand and in real time based on the longitudinal acceleration and the angular rate, one of an on flag and an off flag for each of: the longitudinal acceleration; the angular rate; the demand condition; and the threshold positional condition. After setting at least one on flag, the method includes commanding the actuator to shift the suspension mount between the first mounting point and the second mounting point to thereby adjust the suspension system of the vehicle.

In one aspect, the first mounting point may be a nominal location such that the suspension may have a first jounce recession value and the vehicle may have a first pitch gradient value. The second mounting point may be an adjusted location such that the suspension may have a second jounce recession value that is less than the first jounce recession value and the vehicle may have a second pitch gradient value that is less than the first pitch gradient value. The suspension may have a ride comfort configuration when the suspension has the first jounce recession value in which the wheel translates rearward towards the chassis along a longitudinal axis parallel to the surface as the vehicle traverses an obstacle in the surface; and a pitch performance configuration when the vehicle has the second pitch gradient value in which a rotation of the chassis about a lateral axis of the vehicle is reduced from the first pitch gradient value. Commanding the actuator may include automatically transitioning the suspension from the ride comfort configuration to the pitch performance configuration to thereby reduce the first pitch gradient value and reduce the first jounce recession value in preparation for or during an increased acceleration condition of the vehicle in which the longitudinal acceleration is greater than a threshold value.

In an additional aspect, the method may further include, after commanding the actuator, resetting the actuator with the controller to thereby move the suspension mount from the second mounting point to the first mounting point.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

DETAILED DESCRIPTION

Figure 1:
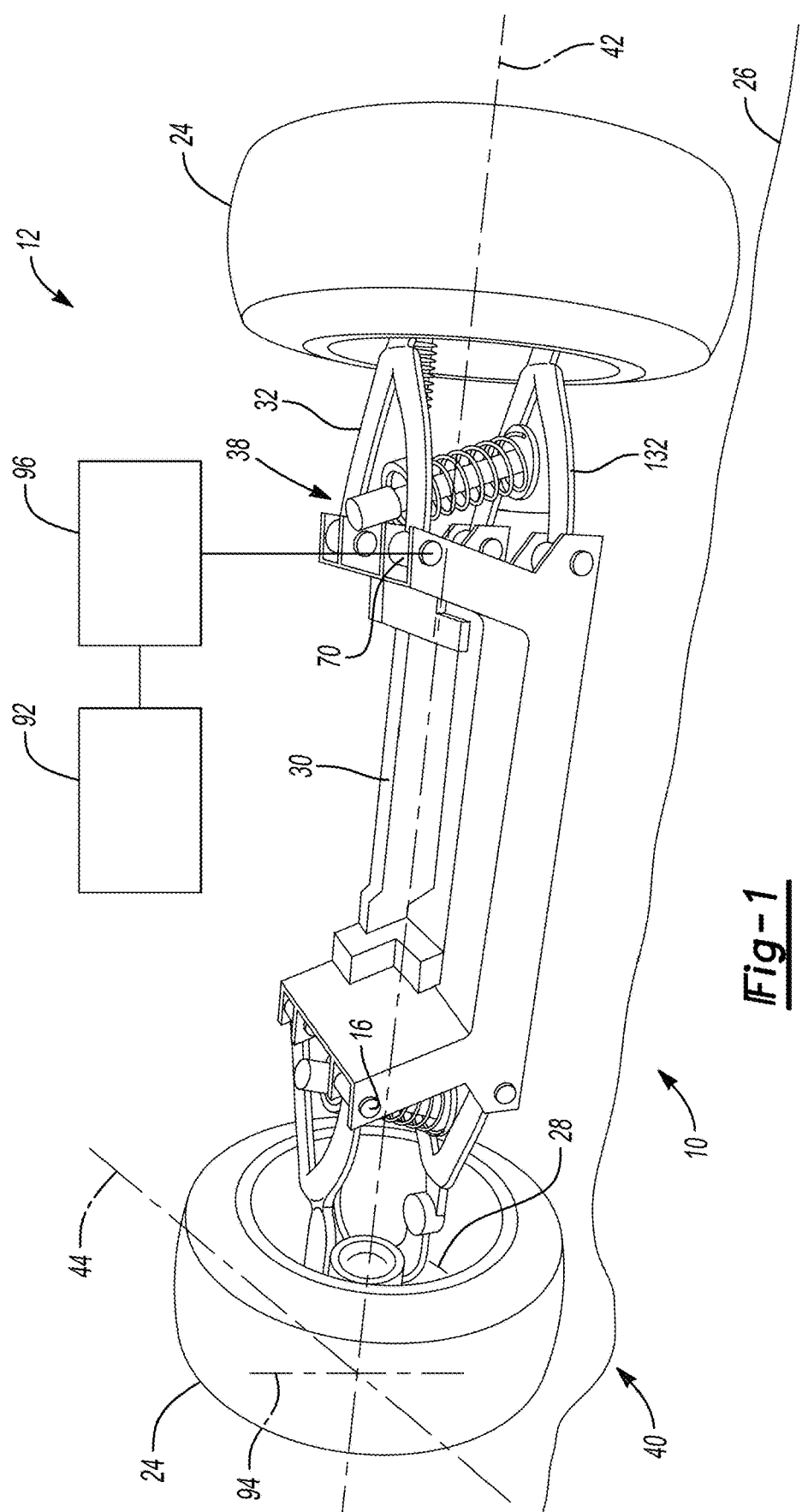
FIG. 1 is a schematic illustration of a perspective view of a vehicle including a suspension system.

Referring to the Figures, wherein like reference numerals refer to like elements, a suspension system 10, a vehicle 12 including the suspension system 10, and a method 14, 114 of adjusting the suspension system 10 are shown generally. The suspension system 10, vehicle 12, and method 14, 114 may be useful for optimizing a tradeoff between ride comfort and pitch performance of the suspension system 10 and vehicle 12. More specifically, the suspension system 10, vehicle 12, and method 14, 114 may allow for on demand and real time adjustment of suspension mounting points 16, 18 (FIG. 2) to thereby shift between a first configuration 20 (FIG. 2) in which the vehicle 12 and suspension system 10 have excellent jounce recession and a second configuration 22 (FIG. 2) in which the vehicle 12 and suspension system 10 have excellent pitch performance in preparation for or during a comparatively high longitudinal acceleration of the vehicle 12.

Therefore, the suspension system 10, vehicle 12, and method 14, 114 may be useful for automotive applications such as, but not limited to, internal combustion engine vehicles, electric vehicles, hybrid vehicles, and the like. For example, the vehicle 12 may be a motor vehicle powered by a motive power source including at least one of an internal combustion engine, an electric motor, and an energy storage device.

Further, the vehicle 12 may be configured for autonomous or automated driving in which the vehicle 12 may be controlled or driven by technology including hardware and software, whether remote to the vehicle 12 or onboard the vehicle 12, that is capable of driving the vehicle 12 without active physical control by a human operator. For example, autonomous or automated driving tasks may include, but are not limited to, object and event detection, recognition, and classification; object and event response; maneuver planning; steering, turning, lane-keeping, signaling, and lane changing; and acceleration and deceleration.

Alternatively, the suspension system 10, vehicle 12, and method 14, 114 may be useful for non-automotive applications such as, but not limited to, aerospace, aviation, marine, mass transportation, agricultural, industrial, and rail applications. For example, the vehicle 12 may be, but is not limited to, a commercial vehicle, industrial vehicle, passenger vehicle, automated guided vehicle (AGV), aircraft, watercraft, train, trolley, bus, or the like. It is also contemplated that the vehicle 12 may be a mobile platform, such as an airplane, all-terrain vehicle (ATV), boat, personal movement apparatus, robot, and the like to accomplish the purposes of this disclosure.

Vehicle and Suspension System

Referring now to FIG. 1, the vehicle 12 includes a wheel 24 configured for traveling along a surface 26 and including a wheel hub 28. The vehicle 12 may include any number of wheels 24, e.g., two or four or six, and the wheel 24 may surround the wheel hub 28. The vehicle 12 also includes the suspension system 10 configured to optimize contact between the wheel 24 and the surface 26. Further, for vehicles 12 including multiple wheels 24, the wheel 24 may be a front or back wheel of the vehicle 12 and the suspension system 10 may be attached to the front and/or back wheel to optimize occupant comfort, balance a tradeoff between jounce recession and pitch performance, manage squat and dive of the vehicle 12, and allow for on demand customization of the suspension system 10 for predicted, impending, or presently occurring comparatively high longitudinal acceleration events of the vehicle 12.

Figure 2:
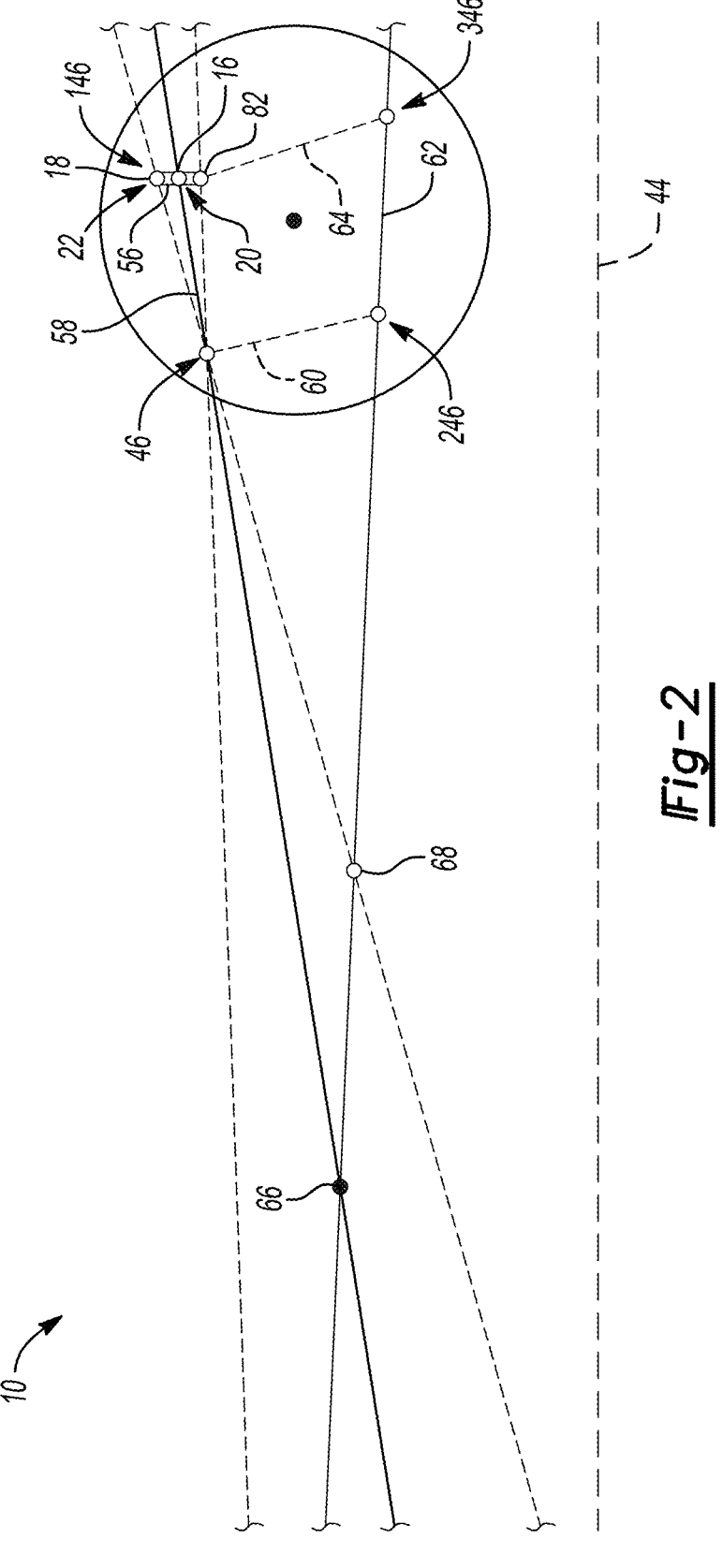
FIG. 2 is a schematic illustration of a side view of a portion of the vehicle and suspension system of FIG. 1.
Figure 3:
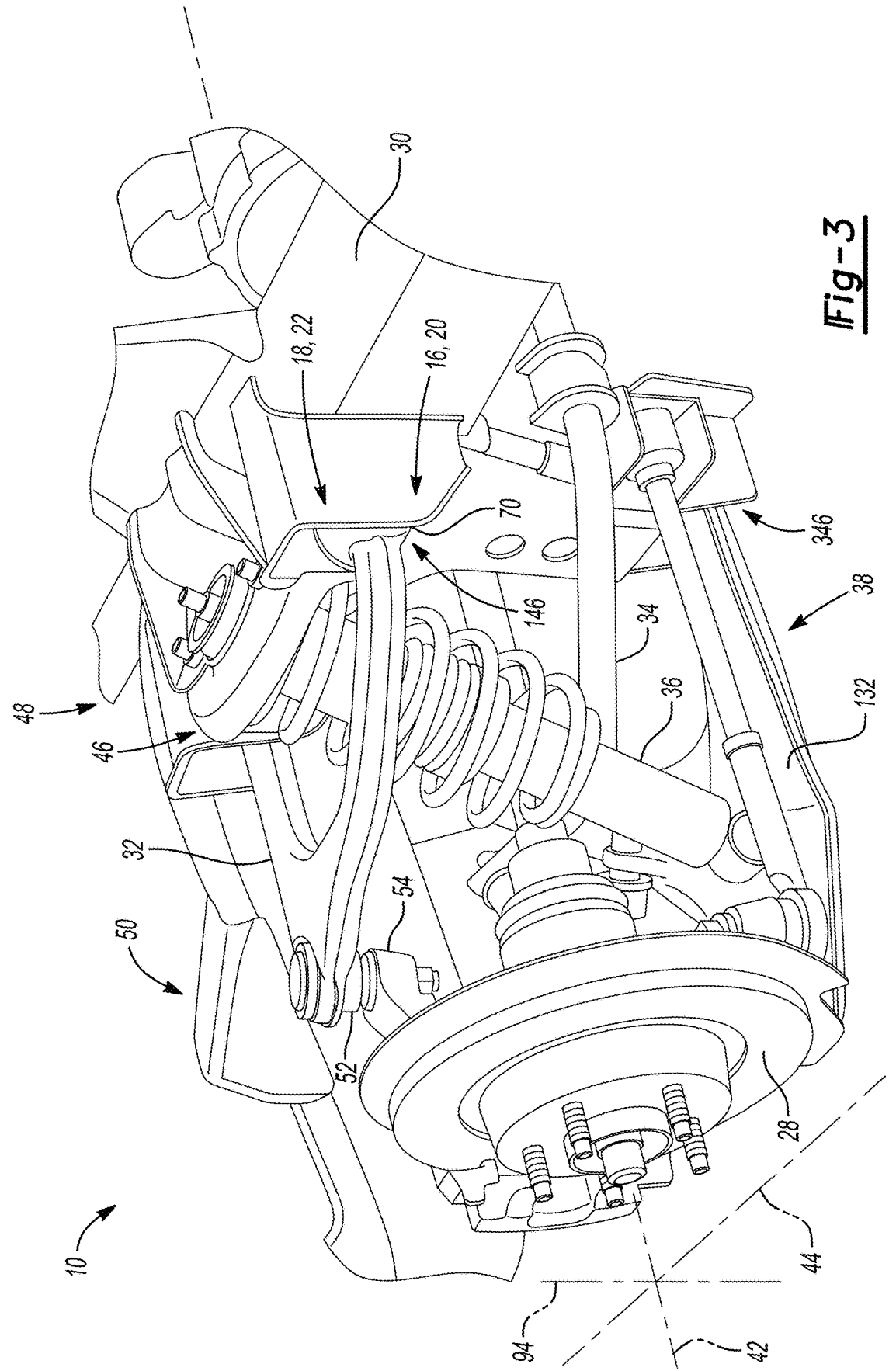
FIG. 3 is a schematic illustration of a perspective view of a portion of the suspension system of FIGS. 1 and 2.

Referring now to FIGS. 1-3, the suspension system 10 includes a chassis 30 spaced apart from the wheel 24 and including a first mounting point 16 (FIG. 2) and a second mounting point 18 (FIG. 2) spaced apart from the first mounting point 16. The first mounting point 16 and the second mounting point 18 may be referred to as hardpoints and may be precise locations on the chassis 30 where components of the suspension system 10, such as control arms 32, 132 (FIGS. 1 and 3), steering linkages 34 (FIG. 3), and shock absorbers 36 (FIG. 3), are attached. The first mounting point 16 and the second mounting point 18 may define a geometry of the suspension system 10 and may impact how the vehicle 12 handles, steers, and rides. That is, as set forth in more detail below, the first mounting point 16 and the second mounting point 18 may dictate kinematic movement and interaction of individual components of the suspension system 10, and may influence parameters such as camber, caster, toe angles, roll center height, ride comfort, jounce, jounce recession, vertical wheel travel, and pitch performance of the vehicle 12. Further, as best shown in FIG. 2, the suspension system 10 may include a plurality of mounting points 16, 18, e.g., four, eight, twelve, or sixteen mounting points 16, 18.

As described with reference to FIG. 2, the first mounting point 16 may be a nominal location such that a suspension 38 has a first jounce recession value and the chassis 30 has a first pitch gradient value. That is, the first jounce recession value and the first pitch gradient value may be baseline or unadjusted jounce recession and pitch gradient values, respectively.

As used herein, jounce may refer to a measurement of upward movement or compression of the suspension 38 when the wheel 24 of the vehicle 12 encounters an obstacle 40, such as an uneven portion of the surface 26, a bump, or a pothole. Jounce recession value may refer to a measurement of a rearward longitudinal movement of the wheel 24 as the suspension 38 travels into jounce. That is, the jounce recession value may describe the magnitude of the movement of the wheel 24 slightly backward relative to the chassis 30 as the wheel 24 moves upward to absorb an impact. Some degree of jounce recession during jounce may be desirable for ride comfort, as the jounce recession helps to absorb impacts effectively and reduces harshness experienced by occupants of the vehicle 12.

Further, as used herein, pitch gradient value may refer to a measurement of how much a body of the vehicle 12 tilts forward or backward, i.e., nose dives or squats, in response to acceleration and braking forces of the vehicle 12. That is, a pitch value may describe a rotation of the body of the vehicle 12 about a lateral axis 42 (FIG. 3) of the vehicle 12, which is perpendicular to a longitudinal axis 44 (FIG. 2) of the vehicle 12 and a direction of travel along the surface 26. When the vehicle 12 accelerates, a rear of the vehicle 12 may squat down and a front of the vehicle 12 may lift up. Conversely, when the vehicle brakes or decelerates, the front of the vehicle 12 may dip down and the rear of the vehicle 12 may lift up. Therefore, the pitch gradient value may quantify a relationship between longitudinal acceleration of the vehicle 12 and a resulting change in a pitch of the vehicle 12. Stated differently, the pitch gradient value may describe how stiff the vehicle 12 is along the longitudinal axis 44. A smaller pitch gradient value may indicate a comparatively stiff suspension 38 that resists pitch more effectively.

Referring again to FIG. 2, the second mounting point 18 may be an adjusted location such that the suspension 38 has a second jounce recession value that is less than the first jounce recession value and the chassis 30 and vehicle 12 have a second pitch gradient value that is less than the first pitch gradient value. Therefore, as set forth in more detail below, when a suspension mount 46, such as an attachment point for shock absorbers 36, strut assemblies, spring mounts, sway bar mounts, subframe mounts, and the like, is attached to the chassis 30 at the first mounting point 16, the vehicle 12 and suspension 38 may have optimized ride comfort at the expense of pitch performance. Conversely, when the suspension mount 46 is disposed at or attached to the chassis 30 at the second mounting point 18, the suspension mount 46 may extend away from the chassis 30 and the vehicle 12 and suspension 38 may have optimized pitch performance at the expense of ride comfort.

Therefore, as described with continued reference to FIG. 2, the suspension 38 may have a ride comfort configuration 20 when the suspension 38 has the first jounce recession value in which the wheel 24 translates rearward towards the chassis 30 along the longitudinal axis 44 parallel to the surface 26 as the vehicle 12 traverses an obstacle 40 in the surface 26. The suspension 38 may also have a pitch performance configuration 22 when the vehicle 12 has the second pitch gradient value in which a rotation of the chassis 30 about the lateral axis 42 of the vehicle 12 is reduced from the first pitch gradient value, i.e., wherein the suspension 38 is comparatively stiffer.

As described with continued reference to FIG. 3, the suspension system 10 also includes the suspension 38 including the control arm 32. The suspension 38 and control arm 32 may be configured to dynamically move as the vehicle 12 encounters obstacles 40, such as bumps, potholes, and uneven portions of the surface 26. When the vehicle 12 encounters obstacles 40, the suspension 38 and control arm 32 may flex and pivot, absorb impact, and allow the wheel 24 to move vertically and longitudinally while maintaining optimal contact with the surface 26. As such, the suspension 38 may provide excellent traction, stability, and ride comfort for the vehicle 12.

Although shown as a double wishbone configuration including an upper control arm 32 and a lower control arm 132 in FIGS. 1 and 3, the suspension 38 may have any suitable configuration and may include any number of control arms 32, 132. As other non-limiting examples, although not shown, the suspension 38 may be configured as a multi-link suspension or a MacPherson strut suspension.

More specifically, a double wishbone configuration may include two control arms 32, 132 each having a wishbone shape on each side of the vehicle 12. This configuration may provide excellent wheel control and may be suitable for performance vehicles 12. The upper and lower control arms 32, 132 may work together to manage wheel movement, allowing for independent suspension and optimal contact between the wheel 24 and the surface 26 to provide the vehicle 12 with excellent handling and ride comfort.

Further, although not shown, a MacPherson strut configuration may include the lower control arm 132 paired with a MacPherson strut, which may act as the upper control arm 32. The MacPherson strut may combine a spring and shock absorber 36 into a single unit and thereby simplify the suspension 38. While simpler and more compact than a double wishbone suspension, a MacPherson strut suspension may be suitable for, for example, passenger vehicles 12.

Likewise, although not shown, a multi-link suspension configuration may include multiple control arms 32, 132 (e.g., three or more) to connect the wheel hub 28 to the chassis 30. This configuration may allow for precise control over wheel movement and may provide excellent handling and ride quality for the vehicle 12.

Referring again to FIG. 3, the control arm 32 may have an inboard end 48 disposed adjacent to the chassis 30 and an outboard end 50 spaced apart from the inboard end 48 and disposed adjacent to the wheel hub 28. The control arm 32 may also have the suspension mount 46 disposed on or at the inboard end 48 and attached to the chassis 30 at one of the first mounting point 16 and the second mounting point 18, and a joint 52 disposed on the outboard end 50 and including a steering knuckle 54 attached to the wheel hub 28. For example, the suspension mount 46 may be a bracket or bolt or other attachment that is attached to the chassis 30 and may allow a pivoting motion of the control arm 32. In other examples, the suspension mount 46 may be an attachment point for shock absorbers 36, strut assemblies, spring mounts, sway bar mounts, subframe mounts, and the like. Further, as best shown in FIGS. 4A-6 and set forth in more detail below, the suspension mount 46 may define a slot 56 therein.

Referring again to FIG. 2, the suspension 38 may further include a plurality of suspension mounts 46, 146, 246, 346 including an upper aft suspension mount 46 and an upper fore suspension mount 146 spaced apart from the upper aft suspension mount 46 along a first longitudinal axis 58. In addition, the plurality of suspension mounts 46, 146, 246, 346 may include a lower aft suspension mount 246 spaced apart from the upper aft suspension mount 46 along a first axis 60, and a lower fore suspension mount 346 spaced apart from the lower aft suspension mount 246 along a second longitudinal axis 62 and spaced apart from the upper fore suspension mount 146 along a second axis 64.

In one non-limiting example, the suspension 38 may include the upper control arm 32 and the lower control arm 132 each having the plurality of suspension mounts 46, 146, 246, 346. The upper control arm 32 may include the upper aft suspension mount 46 and the upper fore suspension mount 146 spaced apart from the upper aft suspension mount 46 along the first longitudinal axis 58. The lower control arm 132 may include the lower aft suspension mount 246 spaced apart from the upper aft suspension mount 46 along the first axis 60, and the lower fore suspension mount 346 spaced apart from the lower aft suspension mount 246 along the second longitudinal axis 62 and spaced apart from the upper fore suspension mount 146 along the second axis 64.

As best shown in FIG. 2, the first longitudinal axis 58 and the second longitudinal axis 62 may intersect at a nominal instant center 66 when one of the plurality of suspension mounts 46, 146, 246, 346 is disposed at the first mounting point 16 such that the suspension 38 has the first jounce recession value and the chassis 30 has the first pitch gradient value. That is, the suspension 38 may have the ride comfort configuration 20 when the one of the plurality of suspension mounts 46, 146, 246, 346 is disposed at the first mounting point 16. Alternatively, the first longitudinal axis 58 and the second longitudinal axis 62 may intersect at an adjusted instant center 68 spaced apart from the nominal instant center 66 when the one of the plurality of suspension mounts 46, 146, 246, 346 is disposed at the second mounting point 18 such that the suspension 38 has the second jounce recession value that is less than the first jounce recession value and the chassis 30 has the second pitch gradient value that is less than the first pitch gradient value. That is, the suspension 38 may have the pitch performance configuration 22 when the one of the plurality of suspension mounts 46, 146, 246, 346 is disposed at the second mounting point 18.

Referring now to FIGS. 4A-6, the suspension system 10 also includes an actuator 70 attached to and configured to shift the suspension mount 46 between the first mounting point 16 and the second mounting point 18. More specifically, the actuator 70 may be configured to shift the suspension mount 46 between the first mounting point 16 and the second mounting point 18 in real time and/or on demand during use of the vehicle 12. That is, the actuator 70 may be configured to move or relocate the suspension mount 46 from the first mounting point 16 to the second mounting point 18 when an operator of the vehicle 12 or driving conditions dictate prioritizing the pitch performance configuration 22 and reducing the first pitch gradient value in preparation for or during comparatively high longitudinal acceleration of the vehicle 12. Similarly, the actuator 70 may be configured to move the suspension mount 46 from the second mounting point 18 to the first mounting point 16 when the operator of the vehicle 12 or driving conditions dictate prioritizing the ride comfort configuration 20 and maintaining the nominal first jounce recession value in preparation for or during standard or comparatively lower longitudinal acceleration of the vehicle 12. In particular, and as set forth in more detail below, the actuator 70 may be configured as a short stroke actuator that shifts a location of the suspension mount 46 to thereby allow the operator and vehicle 12 to trade off jounce recession and pitch performance by allowing jounce recession during comparatively low longitudinal acceleration events, but increasing anti-dive or anti-squat of the suspension 38 for comparatively high longitudinal acceleration events.

Referring again to FIG. 2, the actuator 70 may be attached to any suspension mount 46, 146, 246, 346. For example, the actuator 70 may be attached to one of: i) the upper aft suspension mount 46 such that the actuator 70 is configured to move the upper aft suspension mount 46 along the first axis 60 with respect to the lower aft suspension mount 246; ii) the lower aft suspension mount 246 such that the actuator 70 is configured to move the lower aft suspension mount 246 along the first axis 60 with respect to the upper aft suspension mount 46; iii) the upper fore suspension mount 146 such that the actuator 70 is configured to move the upper fore suspension mount 146 along the second axis 64 with respect to the lower fore suspension mount 346; and iv) the lower fore suspension mount 346 such that the actuator 70 is configured to move the lower fore suspension mount 346 along the second axis 64 with respect to the upper fore suspension mount 146.

Figures 4A, 4B, 4C:
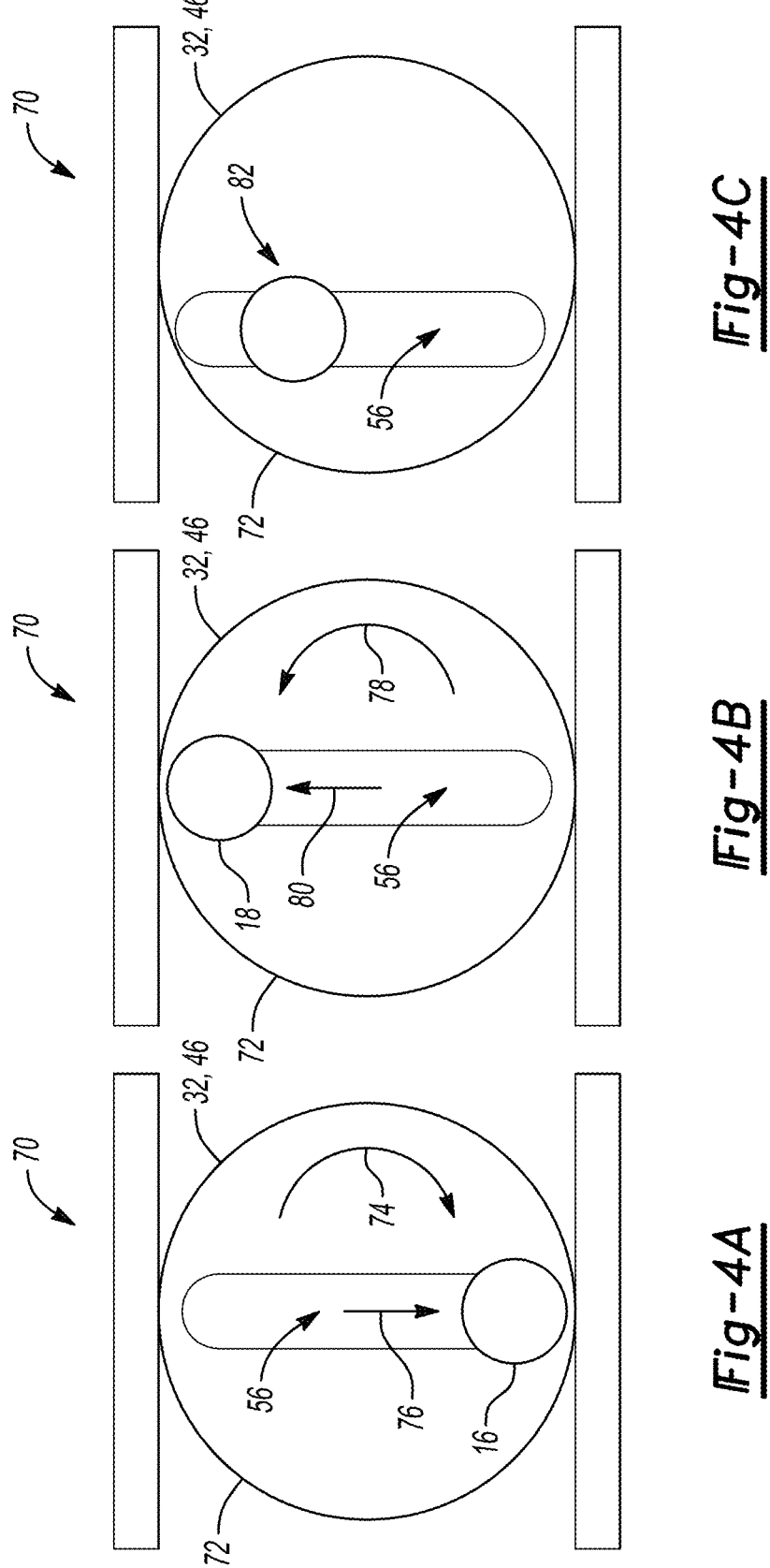
FIG. 4A is a schematic illustration of a side view of an actuator of the suspension system of FIGS. 1-3 disposed at a first mounting point.
FIG. 4B is a schematic illustration of a side view of the actuator of FIG. 4A disposed at a second mounting point.
FIG. 4C is a schematic illustration of a side view of the actuator of FIGS. 4A and 4B disposed at an intermediate mounting point.

Referring now to FIG. 4A, in one non-limiting example, the actuator 70 may be a rotational actuator. As set forth above, the suspension mount 46 may define the slot 56 therein and the rotational actuator may include a camming mechanism 72 configured to move the control arm 32 within the slot 56 towards the chassis 30 to the first mounting point 16 and away from the chassis 30 to the second mounting point 18. For this non-limiting example, the camming mechanism 72 may include an eccentric cam or non-circular lobe that when rotated, shifts the control arm 32 within the slot 56 between the first mounting point 16 and the second mounting point 18.

For example, as described with reference to FIGS. 4A and 4B, the camming mechanism 72 may be turned in a first direction 74 (FIG. 4A) to slide the camming mechanism 72 in one direction 76 (FIG. 4A) to the first mounting point 16 within the slot 56 and may be turned in a second, opposite direction 78 (FIG. 4B) to slide the camming mechanism 72 in an opposite direction 80 (FIG. 4B) to the second mounting point 18 within the slot 56. Further, as best shown in FIG. 4C, the camming mechanism 72 may also be adjusted to an intermediate position 82 between the first mounting point 16 and the second mounting point 18 for precise adjustment of the suspension system 10 if desired.

Figure 5:
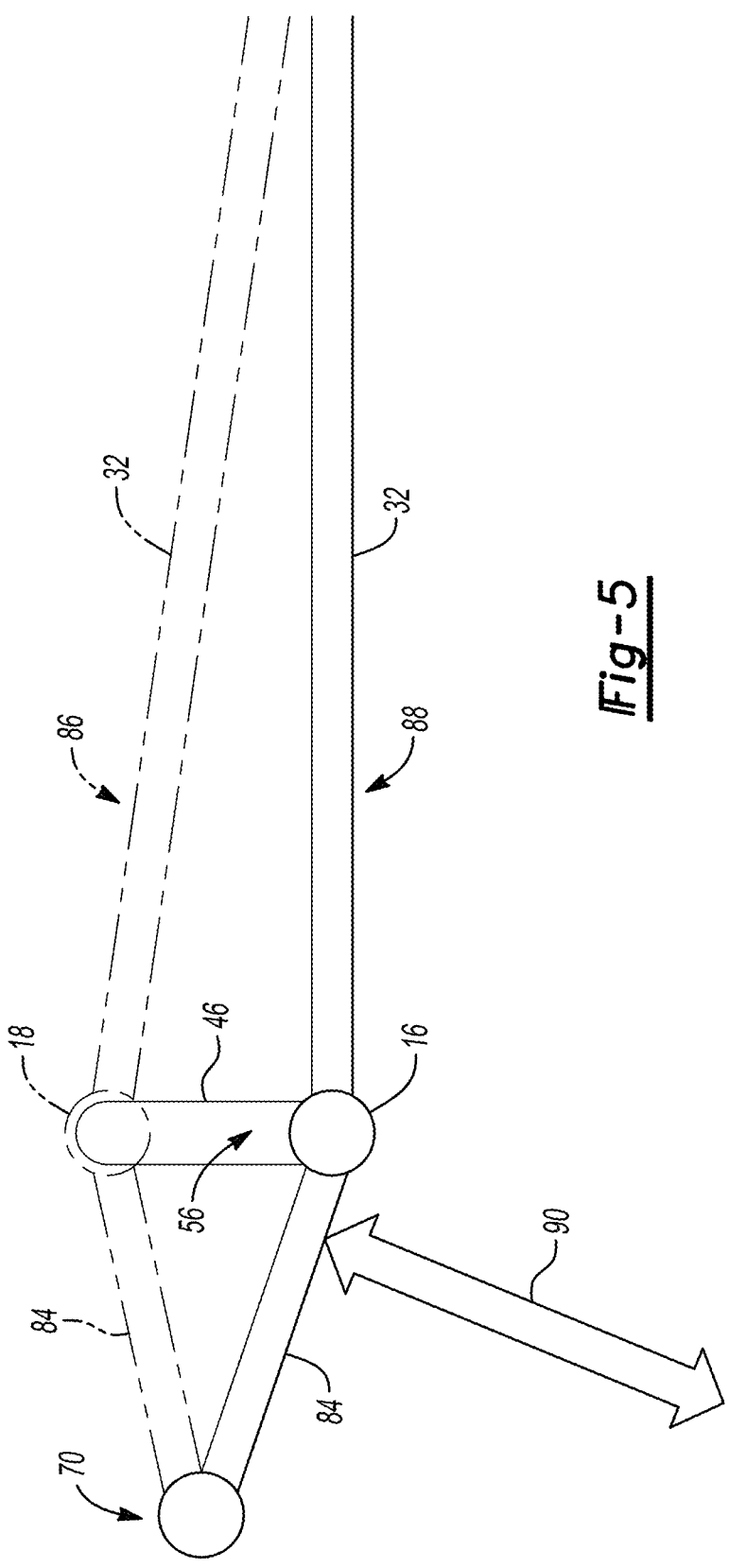
FIG. 5 is a schematic illustration of a side view of another aspect of the actuator of FIGS. 4A-4C.

Referring now to FIG. 5, in another non-limiting example, the actuator 70 may include an over center mechanism 84 configured to move the control arm 32 within the slot 56 towards the chassis 30 to the first mounting point 16 and away from the chassis 30 to the second mounting point 18. For this non-limiting example, the over center mechanism 84 may be a mechanical device that has two stable positions 86, 88 and requires a force 90 greater than a threshold to move from one position to the other. This over center mechanism 84 may be used to create a latching or locking action, as the over center mechanism "snaps" over center and stays in place until the force 90 is applied to move it back. As such, the over center mechanism 84 may reduce a force required to actuate the actuator 70 during comparatively high longitudinal acceleration and comparatively high longitudinal deceleration events. In addition, the over center mechanism 84 may shift the control arm 32 within the slot 56 between the first mounting point 16 and the second mounting point 18 and lock or latch the control arm 32 at the first mounting point 16 or the second mounting point 18.

Figures 6, 7:
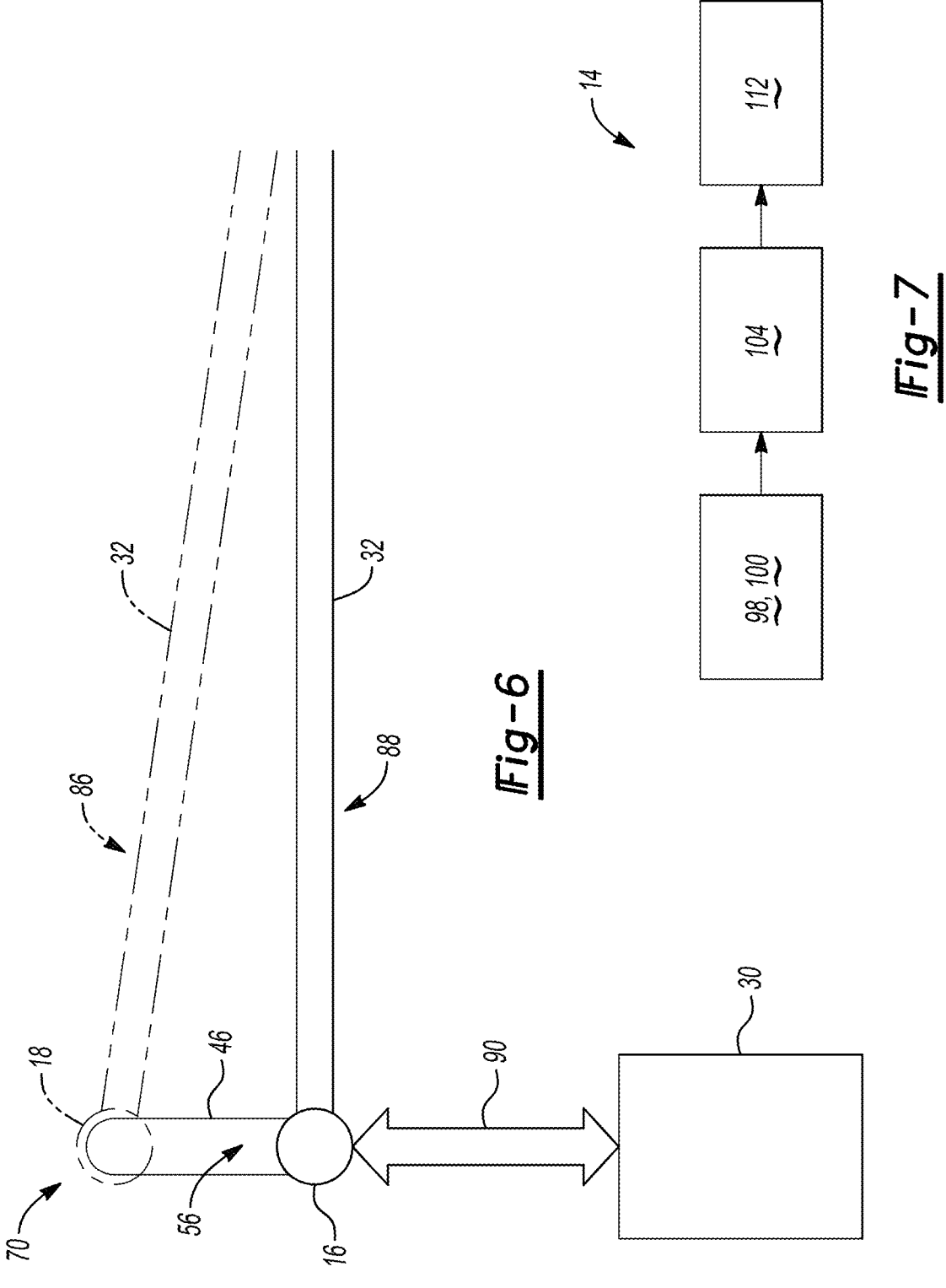
FIG. 6 is a schematic illustration of a side view of an additional aspect of the actuator of FIGS. 4A-5.
FIG. 7 is a schematic flow diagram of a method of adjusting a suspension system.

Referring now to FIG. 6, in another non-limiting example, the actuator 70 may be a linear actuator configured to move the control arm 32 within the slot 56 towards the chassis 30 to the first mounting point 16 and away from the chassis 30 to the second mounting point 18. For this non-limiting example, the linear actuator may be a piston that extends and retracts to thereby shift the suspension mount 46 between two positions 86, 88 and between the first and second suspension mounting points 16, 18.

A default state for the actuator 70 may be in a retracted position 88 such that the suspension mount 46 is attached to the chassis 30 at the first mounting point 16 and the ride comfort configuration 20 is prioritized. For example, the camming mechanism 72, over center mechanism 84, and linear actuator may be configured to mechanically or electrically retract and latch in the retracted position. In one example, the actuator 70 may return to the retracted or base condition using stored electrical energy (e.g., in a super capacitor, battery, electrochemical cell, and the like) and/or mechanical energy (e.g., in a spring, hydraulic device, pneumatic device, and the like) and may be configured to latch or lock in the retracted position 88 until the actuator 70 is actuated.

Referring again to FIG. 1, the vehicle 12 may further include an inertial measurement unit 92 configured for sensing a longitudinal acceleration and an angular rate of the vehicle 12 as the vehicle 12 travels along the surface 26. As used herein, the terminology longitudinal acceleration may refer to an acceleration of the vehicle 12 along the surface 26 in a direction along a length of the vehicle 12, i.e., along the longitudinal axis 44 of the vehicle 12, or forward/backward acceleration. The inertial measurement unit 92 may also be configured for sensing acceleration along other axes 42, 94, such as left/right acceleration and up/down acceleration. As used herein, the terminology angular rate may refer to a yaw rate of the vehicle 12 or a rate at which the vehicle 12 is rotating about a vertical axis 94 of the vehicle 12. That is, the angular rate may measure a speed at which the vehicle 12 is turning left or right, measured in degrees or radians per second. Therefore, the inertial measurement unit 92 may be an electronic device that measures and reports the rotational motion and acceleration of the vehicle 12 and may interact and communicate with other sensors (not shown) such as longitudinal acceleration sensors, lateral acceleration sensors, yaw rate sensors, accelerator pedal sensors, and the like.

As also shown in FIG. 2, the vehicle 12 may further include a controller 96 disposed in electrical communication with the inertial measurement unit 92 and the actuator 70 and configured for actuating the actuator 70 on demand and in real time based on the longitudinal acceleration and the angular rate. That is, the controller 96 may communicate within the actuator 70 and include an instruction set that is executable to actuate the actuator 70 during certain conditions to thereby shift the suspension mount 46 between the first mounting point 16 and the second mounting point 18, as set forth in more detail below. More specifically, the controller 96 may actuate the actuator 70 on demand to move the suspension mount 46 to the first mounting point 16 and thereby prioritize the ride comfort configuration 20 over the pitch performance configuration 22. Similarly, the controller 96 may actuate the actuator 70 on demand to move the suspension mount 46 to the second mounting point 18 and thereby prioritize the pitch performance configuration 22 over the ride comfort configuration 20.

The controller 96 may be onboard the vehicle 12 and may execute the method 14, 114 of adjusting the suspension system 10 of the vehicle 12 described below. In particular, the onboard controller 96 may include a processor configured to operate programmed code and may operate an operating system. The processor may include random access memory (RAM) and a memory storage device such as a hard drive. The onboard controller 96 may include programming to analyze data from the vehicle 12 and diagnose existence of a precursor condition of the method 14, 114.

As described generally with reference to FIG. 7, the onboard controller 96 may be configured for automatedly or autonomously monitoring 98 (FIG. 7) the inertial measurement unit 92 (FIG. 1), setting 100 (FIG. 7) one or more flags 102 (FIG. 8), and commanding 104 (FIG. 7) the actuator 70 to shift the suspension mount 46. That is, the onboard controller 96 may include programming to take actions such as detecting, recognizing, and classifying conditions and events; responding to conditions and events; planning actions; and steering, accelerating, and decelerating the vehicle 12 with or without active physical control by a human operator.

The onboard controller 96 may also include programming to take further actions regarding aspects of the method 14, 114, such as monitoring 98 (FIG. 7) the inertial measurement unit 92, a demand condition 106 (FIG. 8), and a threshold positional condition 108 (FIG. 8) of the vehicle 12; setting 100 (FIG. 7) one of an on flag 102 (FIG. 8) and an off flag 103 (FIG. 8); commanding 104 the actuator 70 to move the suspension mount 46; ending the method 14, 114; electrically communicating with sensors or other components of the vehicle 12; monitoring driving behavior of the vehicle 12; and the like.

In addition, although not shown in detail, the vehicle 12 may include a communications bus configured for enabling electronic communication between components of the vehicle 12. The vehicle 12 may include sensors, and the sensors, the onboard controller 96, and the actuator 70, may be electrically connected to the communication bus and may transmit data and computerized commands therethrough to execute the aspects of the method 14, 114.

Method of Adjusting the Suspension System

Referring again to FIG. 7, the method 14 of adjusting the suspension system 10 of the vehicle 12 includes monitoring 98 the internal measurement unit 92 of the vehicle 12 that is configured for sensing the longitudinal acceleration and the angular rate of the vehicle 12 as the wheel 24 of the vehicle 12 travels along the surface 26. The method 14 also includes monitoring 98 the demand condition 106 (FIG. 8) requesting adjustment of the suspension system 10 and a threshold positional condition 108 of the vehicle 12, such as, for example, a steering wheel angle of the vehicle 12, a ride height of the vehicle 12, an accelerator position of the vehicle 12, a brake pedal position of the vehicle 12, and the like, as set forth in more detail below.

For example, the demand condition 106 may include both manual and automatic operation of the actuator 70. For manual operation, the operator of the vehicle 12 may actuate a dedicated switch to actuate the actuator 70. For automatic operation, the demand condition 106 may include a) an automatic detection of a pending or occurring comparatively high longitudinal acceleration event and b) a mode selection to prepare for the comparatively high longitudinal acceleration event.

For a) automatic detection, monitoring 98 may include assessing the accelerator pedal position of the vehicle 12, a one-pedal driving speed/torque profile, the brake pedal position of the vehicle 12, and autonomous longitudinal acceleration requests. If any of the aforementioned positions, profiles, and requests are predicted to cause a comparatively high longitudinal acceleration of the vehicle 12, the controller 96 may automatically actuate the actuator 70 to shift the suspension mount 46 from the first mounting point 16 to the second mounting point 18.

Alternatively, for b) mode selection operation, once the operator of the vehicle 12 selects a vehicle mode in which an increased longitudinal acceleration is detected, such as, but not limited to, a launch control mode, a double paddle declutch mode, a maximum power mode, a sport mode, a track mode, and the like, the controller 96 may automatically actuate the actuator 70 to thereby shift the suspension mount 46 to a different mounting point 16, 18.

Referring again to the method 14 and described with continued reference to FIG. 7, the method 14 also includes, concurrent to monitoring 98, setting 100, with the controller 96, one of the on flag 102 and the off flag 103 for each of: the longitudinal acceleration, the angular rate, the demand condition 106, and the threshold positional condition 108. That is, as set forth in more detail below, the method 14 may include assessing expected or occurring operating conditions of the vehicle 12, setting 100 the on flag 102 for each operating condition in which a threshold value or condition is met, and setting 100 the off flag 103 for each operation condition in which the threshold value or condition is not met.

Further, with continued reference to FIG. 7, after setting 100 at least one on flag 102, the method 14 includes commanding 104 the actuator 70 to shift the suspension mount 46 between the first mounting point 16 and the second mounting point 18 to thereby adjust the suspension system 10 of the vehicle 12. That is, commanding 104 the actuator 70 may include automatically transitioning the suspension 38 from the ride comfort configuration 20 to the pitch performance configuration 22 to thereby reduce the first pitch gradient value and reduce the first jounce recession value in preparation for or during an increased acceleration condition of the vehicle 12 in which the longitudinal acceleration is greater than a threshold value.

In addition, the method 14 may include, after commanding 104 the actuator 70, resetting 112 the actuator 70 with the controller 96 to thereby move the suspension mount 46 from the second mounting point 18 to the first mounting point 16. For example, for both the a) automatic detection and b) manual mode selection, the controller 96 and inertial measurement unit 92 may monitor vehicle acceleration, suspension angles, steering angles, and the like for an opportune time to retract the actuator 70 and thereby shift the suspension mount 46 from the second mounting point 18 to the first mounting point 16. That is, the default state for the actuator 70 may be in the retracted position such that the suspension mount 46 is attached to the chassis 30 at the first mounting point 16 and the ride comfort configuration 20 is prioritized.

Figure 8:
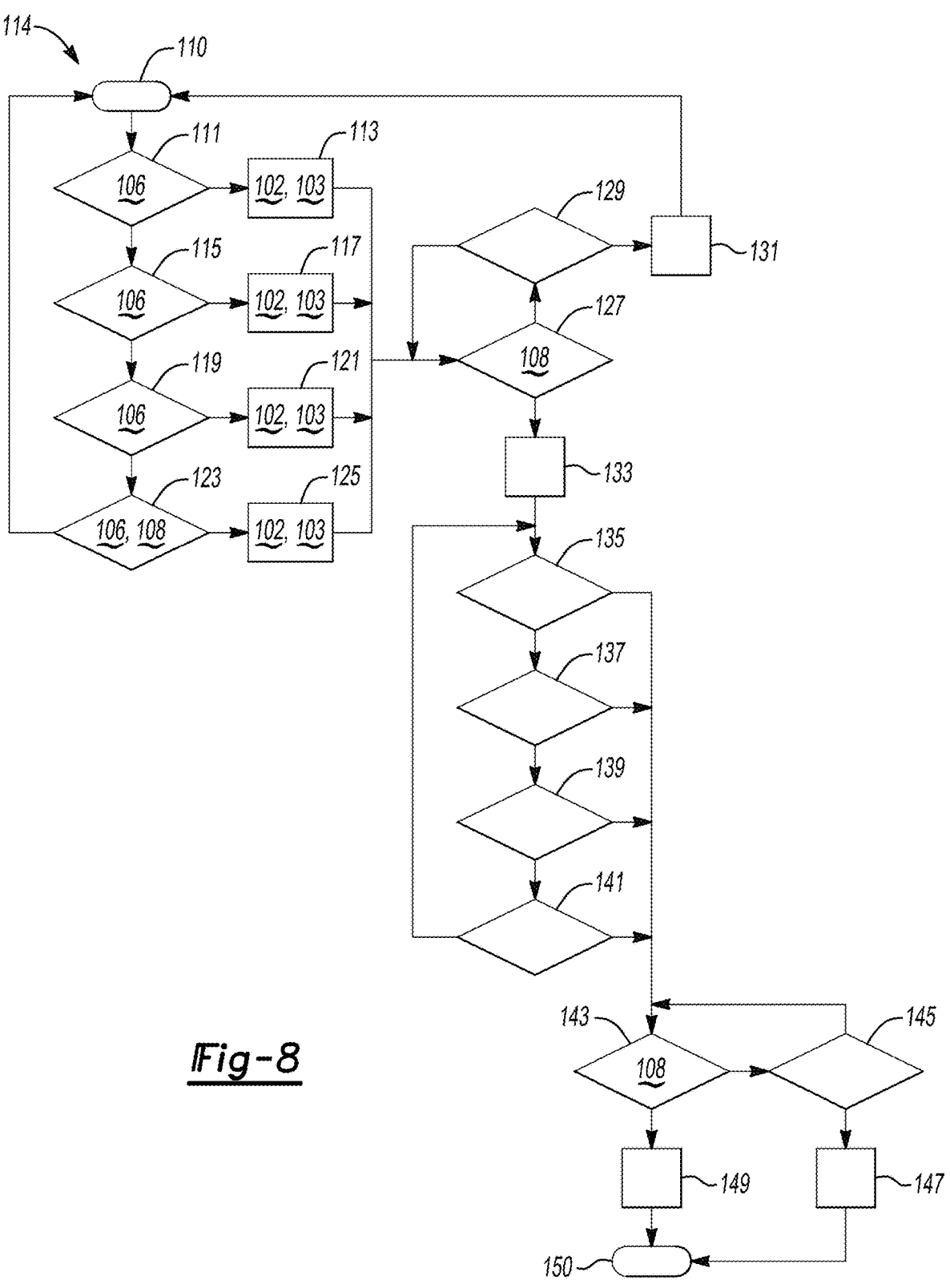
FIG. 8. is a schematic flow diagram of another aspect of the method of FIG. 7.

Referring now to FIG. 8, in one example of the method 114, from a start 110 of the method 114, the method 114 may proceed to block 111 to determine whether the operator has pressed or selected a manual actuation button as the demand condition 106 to manually request actuation of the actuator 70. If the operator has pressed or selected the manual actuation button, the method 114 may include setting the on flag 102 for the demand condition 106, i.e., the on flag 102 for a manual actuation button, at block 113. If the operator has not pressed or selected the manual actuation button, the method 114 may proceed to block 115 to determine whether the operator has selected a high performance vehicle mode, e.g., maximum power mode, sport mode, track mode, and the like.

If the operator has selected the high performance vehicle mode, the method 114 may include setting the on flag 102 for the demand condition 106, i.e., the on flag 102 for the high performance vehicle mode, at block 117. If the operator has not selected the high performance vehicle mode, the method 114 may proceed to block 119 to determine whether the operator has selected an anti-squat vehicle mode, such as double paddle declutch mode or launch control mode.

If the operator has selected the anti-squat vehicle mode, the method 114 may include setting the on flag 102 for the demand condition 106, i.e., the on flag 102 for the anti-squat vehicle mode, at block 121. If the operator has not selected the anti-squat vehicle mode, the method 114 may proceed to block 123 to determine whether the accelerator position exceeds a threshold or the brake pedal position exceeds a threshold or an autonomous torque request exceeds a threshold, each of which may indicate that a comparatively high longitudinal acceleration request is impending.

If the any of the accelerator pedal position, brake pedal position, and autonomous torque request exceed the respective threshold, the method 114 may include setting the on flag 102 for the threshold positional condition 108, i.e., the on flag 102 for detecting acceleration, at block 125. If any of the accelerator pedal position, brake pedal position, and autonomous torque request has not exceeded the respective threshold, the method 114 may return to the start 110.

Further, if any of the on flags 102 at blocks 113, 117, 121, and 125 are set, the method 114 may proceed to block 127 to determine whether the steering wheel angle, the ride height, and the longitudinal acceleration of the vehicle 12 are below a respective threshold. That is, the method 114 may include checking the vehicle 12 for ideal actuation conditions, e.g., ensuring that the steering wheel is not turned hard over center, ensuring that one or more wheels 24 is not parked on a curb, ensuring that the vehicle 12 is not accelerating over a desired rate, etc.

If the steering wheel angle and the ride height and the longitudinal acceleration of the vehicle 12 are not below the respective threshold, the method 114 may proceed to block 129 to determine whether a time since an actuation or extension of the actuator 70 request has exceeded an error threshold. If the time has exceeded the error threshold, the method 114 may proceed to block 131 to set an error flag, clear the on flags 102, and notify the operator of the vehicle 12 that the actuation or extension request is denied or infeasible. Thereafter, the method 14 may return to start 110.

However, if the steering wheel angle and the ride height and the longitudinal acceleration of the vehicle 12 are below the respective threshold, the method 114 may proceed to block 133 to command extension of the actuator 70 to thereby shift the suspension mount 46 between the first mounting point 16 and the second mounting point 18.

After commanding 104 (FIG. 7) the actuator 70, the method 114 may proceed to block 135 to determine whether the on flag 102 for the anti-squat vehicle mode is set and the longitudinal acceleration of the vehicle 12 is below the threshold for a time. If the on flag 102 for the anti-squat vehicle mode and the longitudinal acceleration of the vehicle 12 is not below the threshold for a time, the method 114 may proceed to block 137 to determine whether the on flag 102 for a manual actuation button is set and the operator has pressed a deactivation button.

If the on flag 102 for the manual activation button is not set and the operator has not pressed the deactivation button, the method 114 may proceed to block 139 to determine whether the on flag 102 for the high performance vehicle mode is set and the operator has selected a non-high performance vehicle mode. If the on flag 102 for the high performance vehicle mode is not set and the operator has not selected the non-high performance vehicle mode, the method 114 may proceed to block 141 to determine whether the on flag 102 for detecting acceleration is set and the longitudinal acceleration is below the threshold for a time. If the on flag 102 for detecting acceleration is not set and the longitudinal acceleration is not below the threshold for the time, the method 114 may return to block 135.

If a) the on flag 102 for the anti-squat vehicle mode is set and the longitudinal acceleration of the vehicle 12 is below the threshold for the time or b) the on flag 102 for the manual actuation button is set and the operator has pressed the deactivation button or c) the on flag 102 for the high performance vehicle mode is set and the operator has selected the non-high performance vehicle mode or d) the on flag 102 for detecting acceleration is set and the longitudinal acceleration is below the threshold for the time, the method 114 may proceed to block 143 to determine whether the steering wheel angle and the ride height and the longitudinal acceleration of the vehicle 12 are below a respective threshold. That is, the method 114 may include checking the vehicle 12 for ideal actuation conditions, e.g., ensuring that the steering wheel is not turned hard over center, ensuring that one or more wheels 24 is not parked on a curb, ensuring that the vehicle 12 is not accelerating over a desired rate, etc.

If the steering wheel angle and the ride height and the longitudinal acceleration of the vehicle 12 are not below the respective threshold, the method 114 may proceed to block 145 to determine whether a time since an actuation or extension of the actuator 70 request has exceeded the error threshold. If the time has exceeded the error threshold, the method 114 may proceed to block 147 to set the error flag, clear the on flags 102, and notify the operator of the vehicle 12 that the actuation or extension request is denied or infeasible. Thereafter, the method 114 may end 150 and return to start 110.

However, if the steering wheel angle and the ride height and the longitudinal acceleration of the vehicle 12 are below the respective threshold, the method 114 may proceed to block 149 to command extension of the actuator 70 to thereby shift the suspension mount 46 between the first mounting point 16 and the second mounting point 18.

Therefore, in summary, the suspension system 10, vehicle 12, and method 14, 114 may optimize the tradeoff between ride comfort and pitch performance of the suspension system 10 and vehicle 12. More specifically, the suspension system 10, vehicle 12, and method 14, 114 may allow for on demand and real time adjustment of suspension mounting points 16, 18 to shift between the first configuration 20 having excellent jounce recession and the second configu-
ration 22 having excellent pitch performance in preparation
for or during comparatively high longitudinal acceleration of
the vehicle 12. That is, the suspension system 10, vehicle 12
and method 14, 114 may allow the vehicle to automatically
transition or to transition on demand from the ride comfort
configuration 20 and to the pitch performance configuration
22 to thereby reduce the pitch gradient value and reduce the
jounce recession value. Further, the disclosed vehicle 12,
suspension system 10, and method 14, 114 may automati-
cally prioritize the pitch performance configuration 22 over
the ride comfort configuration 20 in preparation for or
during a sensed increased acceleration condition in which
the longitudinal acceleration of the vehicle 12 is greater than
the threshold value.

The described embodiments of the present disclosure are
intended to serve as non-limiting examples, and other
embodiments may take various and alternative forms. In
addition, the appended drawings are not necessarily to scale,
and may present a somewhat simplified representation of
various features of the present disclosure, including, for
example, specific dimensions, orientations, locations, and
shapes. Details associated with such features will be deter-
mined in part by the intended application and use environ-
ment of the described embodiments.

For purposes of the present description, unless specifi-
cally disclaimed, use of the singular includes the plural and
vice versa, the terms "and" and "or" shall be both conjunc-
tive and disjunctive, and the words "including", "contain-
ing", "comprising", "having", and the like shall mean
"including without limitation". Moreover, words of approxi-
mation such as "about", "substantially", "generally",
"approximately", etc., may be used herein in the sense of "at,
near, or nearly at", or "within 0-5% of", or "within accept-
able manufacturing tolerances", or logical combinations
thereof. As used herein, a component that is "configured to"
perform a specified function is capable of performing the
specified function without alteration, rather than merely
having potential to perform the specified function after
further modification. In other words, the described hard-
ware, when expressly configured to perform the specified
function, is specifically selected, created, implemented, uti-
lized, programmed, and/or designed for the purpose of
performing the specified function. In addition, the use of
ordinals such as first, second and third does not necessarily
imply a ranked sense of order, but rather may merely
distinguish between multiple instances of an act or structure.

The detailed description and the drawings or figures are
supportive and descriptive of the present teachings, but the
scope of the present teachings is defined solely by the
claims. While some of the best modes and other embodi-
ments for carrying out the present teachings have been
described in detail, various alternative designs and embodi-
ments exist for practicing the present teachings defined in
the appended claims. Moreover, this disclosure expressly
includes combinations and sub-combinations of the ele-
ments and features presented above and below.

What is claimed is:

1. A suspension system for a vehicle, the suspension
system comprising:
  a chassis having a first mounting point and a second
    mounting point spaced apart from the first mounting
    point;
  a suspension including a suspension mount attached to the
    chassis at one of the first mounting point and the second
    mounting point; and

16 an actuator attached to and configured to shift the sus-
    pension mount between the first mounting point and the
    second mounting point;
  wherein:
    the first mounting point is a nominal location such that
      the suspension has a first jounce recession value and
      the chassis has a first pitch gradient value; and
    the second mounting point is an adjusted location such
      that the suspension has a second jounce recession
      value that is less than the first jounce recession value
      and the chassis has a second pitch gradient value that
      is less than the first pitch gradient value.

2. The suspension system of claim 1, wherein the sus-
pension further includes a plurality of suspension mounts
including:
  an upper aft suspension mount;
  an upper fore suspension mount spaced apart from the
    upper aft suspension mount along a first longitudinal
    axis;
  a lower aft suspension mount spaced apart from the upper
    aft suspension mount along a first axis; and
  a lower fore suspension mount spaced apart from the
    lower aft suspension mount along a second longitudinal
    axis and spaced apart from the upper fore suspension
    mount along a second axis;
  wherein the first longitudinal axis and the second longi-
    tudinal axis intersect at: a nominal instant center when
    one of the plurality of suspension mounts is disposed at
    the first mounting point such that the suspension has a
    first jounce recession value and the chassis has a first
    pitch gradient value; and
  an adjusted instant center spaced apart from the nominal
    instant center when the one of the plurality of suspen-
    sion mounts is disposed at the second mounting point
    such that the suspension has a second jounce recession
    value that is less than the first jounce recession value
    and the chassis has a second pitch gradient value that is
    less than the first pitch gradient value.

3. The suspension system of claim 1, wherein the sus-
pension mount extends away from the chassis when the
suspension mount is disposed at the second mounting point.

4. The suspension system of claim 1, wherein the sus-
pension includes a control arm having an inboard end
adjacent the chassis; and
  wherein the suspension mount is disposed at the inboard
    end and defines a slot therein.

5. The suspension system of claim 4, wherein the actuator
is a rotational actuator and includes a camming mechanism
configured to move the control arm within the slot towards
the chassis to the first mounting point and away from the
chassis to the second mounting point.

6. The suspension system of claim 4, wherein the actuator
includes an over center mechanism configured to move the
control arm within the slot towards the chassis to the first
mounting point and away from the chassis to the second
mounting point.

7. The suspension system of claim 4, wherein the actuator
is a linear actuator configured to move the control arm
within the slot towards the chassis to the first mounting point
and away from the chassis to the second mounting point.

8. A vehicle comprising:
  a wheel configured for traveling along a surface and
    including a wheel hub; and
  a suspension system configured to optimize contact
    between the wheel and the surface, the suspension
    system including:

a chassis spaced apart from the wheel and including a first mounting point and a second mounting point spaced apart from the first mounting point;

a suspension including a control arm having:

an inboard end disposed adjacent to the chassis;

an outboard end disposed adjacent to the wheel hub;

a suspension mount disposed on the inboard end and attached to the chassis at one of the first mounting point and the second mounting point; and a joint disposed on the outboard end and including a steering knuckle attached to the wheel hub; and an actuator attached to and configured to shift the suspension mount between the first mounting point and the second mounting point.

9. The vehicle of claim 8, wherein:

the first mounting point is a nominal location such that the suspension has a first jounce recession value and the vehicle has a first pitch gradient value; and the second mounting point is an adjusted location such that the suspension has a second jounce recession value that is less than the first jounce recession value and the vehicle has a second pitch gradient value that is less than the first pitch gradient value.

10. The vehicle of claim 9, further including:

an inertial measurement unit configured for sensing a longitudinal acceleration and an angular rate of the vehicle as the vehicle travels along the surface; and a controller disposed in electrical communication with the inertial measurement unit and the actuator and configured for actuating the actuator on demand and in real time based on the longitudinal acceleration and the angular rate.

11. The vehicle of claim 10, wherein the suspension has:

a ride comfort configuration when the suspension has the first jounce recession value in which the wheel translates rearward towards the chassis along a longitudinal axis parallel to the surface as the vehicle traverses an obstacle in the surface; and a pitch performance configuration when the vehicle has the second pitch gradient value in which a rotation of the chassis about a lateral axis of the vehicle is reduced from the first pitch gradient value;

wherein the controller actuates the actuator on demand to move the suspension mount to the first mounting point and thereby prioritizes the ride comfort configuration over the pitch performance configuration; and wherein the controller actuates the actuator on demand to move the suspension mount to the second mounting point and thereby prioritizes the pitch performance configuration over the ride comfort configuration.

12. The vehicle of claim 8, wherein the suspension mount defines a slot therein.

13. The vehicle of claim 12, wherein the actuator is a rotational actuator and includes a camming mechanism configured to move the control arm within the slot towards the chassis to the first mounting point and away from chassis to the second mounting point.

14. The vehicle of claim 12, wherein the actuator includes an over center mechanism configured to move the control arm within the slot towards the chassis to the first mounting point and away from the chassis to the second mounting point.

15. The vehicle of claim 12, wherein the actuator is a linear actuator configured to move the control arm within the slot towards the chassis to the first mounting point and away from the chassis to the second mounting point.

16. The vehicle of claim 8, wherein the suspension further includes an upper control arm and a lower control arm each having a plurality of suspension mounts;

wherein the upper control arm includes:

an upper aft suspension mount; and an upper fore suspension mount spaced apart from the upper aft suspension mount along a first longitudinal axis;

wherein the lower control arm includes:

a lower aft suspension mount spaced apart from the upper aft suspension mount along a first axis; and a lower fore suspension mount spaced apart from the lower aft suspension mount along a second longitudinal axis and spaced apart from the upper fore suspension mount along a second axis; and wherein the actuator is attached to one of:

the upper aft suspension mount such that the actuator is configured to move the upper aft suspension mount along the first axis with respect to the lower aft suspension mount;

the lower aft suspension mount such that the actuator is configured to move the lower aft suspension mount along the first axis with respect to the upper aft suspension mount;

the upper fore suspension mount such that the actuator is configured to move the upper fore suspension mount along the second axis with respect to the lower fore suspension mount; and the lower fore suspension mount such that the actuator is configured to move the lower fore suspension mount along the second axis with respect to the upper fore suspension mount.

17. A method of adjusting a suspension system of a vehicle, the method comprising:

monitoring:

an inertial measurement unit of the vehicle configured for sensing a longitudinal acceleration and an angular rate of the vehicle as a wheel of the vehicle travels along a surface; a demand condition requesting adjustment of the suspension system, wherein the suspension system includes:

a chassis having a first mounting point and a second mounting point spaced apart from the first mounting point;

a suspension including a suspension mount attached to the chassis at one of the first mounting point and the second mounting point; and an actuator attached to and configured to shift the suspension mount between the first mounting point and the second mounting point; and a threshold positional condition of the vehicle;

concurrent to monitoring, setting, with a controller that is disposed in electrical communication with the inertial measurement unit and the actuator and configured for actuating the actuator on demand and in real time based on the longitudinal acceleration and the angular rate, one of an on flag and an off flag for each of:

the longitudinal acceleration;

the angular rate;

the demand condition; and the threshold positional condition; and after setting at least one on flag, commanding the actuator to shift the suspension mount between the first mounting point and the second mounting point to thereby adjust the suspension system of the vehicle.

18. The method of claim 17, wherein:

the first mounting point is a nominal location such that the suspension has a first jounce recession value and the vehicle has a first pitch gradient value; and the second mounting point is an adjusted location such that the suspension has a second jounce recession value that is less than the first jounce recession value and the vehicle has a second pitch gradient value that is less than the first pitch gradient value;

wherein the suspension has:

a ride comfort configuration when the suspension has the first jounce recession value in which the wheel translates rearward towards the chassis along a longitudinal axis parallel to the surface as the vehicle traverses an obstacle in the surface; and a pitch performance configuration when the vehicle has the second pitch gradient value in which a rotation of the chassis about a lateral axis of the vehicle is reduced from the first pitch gradient value; and wherein commanding the actuator includes automatically transitioning the suspension from the ride comfort configuration to the pitch performance configuration to thereby reduce the first pitch gradient value and reduce the first jounce recession value in preparation for or during an increased acceleration condition of the vehicle in which the longitudinal acceleration is greater than a threshold value.

19. The method of claim 17, further including, after commanding the actuator, resetting the actuator with the controller to thereby move the suspension mount from the second mounting point to the first mounting point.

\*    \*    \*    \*    \*